(12) United States Patent
Wu et al.

(10) Patent No.: US 12,131,584 B2
(45) Date of Patent: Oct. 29, 2024

(54) EXPRESSION RECOGNITION METHOD AND APPARATUS, ELECTRONIC DEVICE, AND STORAGE MEDIUM

(71) Applicant: BOE TECHNOLOGY GROUP CO., LTD., Beijing (CN)

(72) Inventors: Yanhong Wu, Beijing (CN); Guannan Chen, Beijing (CN); Pablo Navarrete Michelini, Beijing (CN); Lijie Zhang, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 409 days.

(21) Appl. No.: 17/642,781

(22) PCT Filed: Mar. 10, 2021

(86) PCT No.: PCT/CN2021/079881
§ 371 (c)(1),
(2) Date: Mar. 14, 2022

(87) PCT Pub. No.: WO2021/218415
PCT Pub. Date: Nov. 4, 2021

(65) Prior Publication Data
US 2022/0319233 A1 Oct. 6, 2022

(30) Foreign Application Priority Data
Apr. 30, 2020 (CN) .......... 202010364481.X

(51) Int. Cl.
*G06V 40/16* (2022.01)

(52) U.S. Cl.
CPC .......... *G06V 40/174* (2022.01); *G06V 40/166* (2022.01); *G06V 40/172* (2022.01)

(58) Field of Classification Search
None
See application file for complete search history.

(56) References Cited

U.S. PATENT DOCUMENTS 11,049,018 B2 * 6/2021 Yang .................. G06F 18/24
11,908,240 B2 * 2/2024 Tao .................... G06V 10/454
(Continued)

FOREIGN PATENT DOCUMENTS

CN 101872424 A 10/2010
CN 102831447 A 12/2012
(Continued)

OTHER PUBLICATIONS

International Search Report issued Jun. 9, 2021 in International Application No. PCT/CN2021/079881, 4 pages.
(Continued)

*Primary Examiner* — Tsung Yin Tsai
(74) *Attorney, Agent, or Firm* — XSENSUS LLP

(57) ABSTRACT

An expression recognition method is described that includes acquiring a face image to be recognized, and inputting the face image into N different recognition models arranged in sequence for expression recognition and outputting an actual expression recognition result, the N different recognition models being configured to recognize different target expression types, wherein N is an integer greater than 1.

20 Claims, 8 Drawing Sheets

(56) References Cited

U.S. PATENT DOCUMENTS

| | | | | |
|---|---|---|---|---|
| 2003/0123713 | A1* | 7/2003 | Geng | G06F 18/28 |
| | | | | 348/47 |
| 2016/0217319 | A1* | 7/2016 | Bhanu | G06V 10/754 |
| 2018/0181840 | A1 | 6/2018 | Zatepyakin | |
| 2018/0373985 | A1* | 12/2018 | Yang | G06V 10/82 |
| 2019/0213399 | A1* | 7/2019 | Yoo | G06V 40/168 |
| 2022/0269881 | A1* | 8/2022 | Tao | G06N 3/049 |

FOREIGN PATENT DOCUMENTS

| | | | |
|---|---|---|---|
| CN | 107358169 | A | 11/2017 |
| CN | 109635668 | A | 4/2019 |
| CN | 110135257 | A | 8/2019 |
| CN | 110458058 | A | 11/2019 |
| CN | 111582136 | A | 8/2020 |
| EP | 3 340 109 | A1 | 6/2018 |
| WO | 2018/118099 | A1 | 6/2018 |
| WO | 2019/119396 | A1 | 6/2019 |

OTHER PUBLICATIONS

Written Opinion of the International Searching Authority issued Jun. 9, 2021 in International Application No. PCT/CN2021/079881, 4 pages.

Christopher Pramerdorfer, et al., "Facial Expression Recognition using Convolutional Neural Networks: State of the Art", Computer Vision Lab, Dec. 9, 2016, 6 pages.

Zhanpeng Zhang, et al., "Learning Social Relation Traits from Face Images", Department of Information Engineering, The Chinese University of Hong Kong, 2015, 9 pages.

Zhiding Yu, et al., "Image based Static Facial Expression Recognition with Multiple Deep Network Learning", ICMI 2015, Nov. 9-13, 2015, 8 pages.

Office Action issued on Apr. 8, 2023, in corresponding Chinese patent Application No. 202010364481.X, 14 pages.

* cited by examiner

CL: Convolutional Layer
GAPL: Global Average Pooling Layer
FCL: Fully Connected Layer

EXPRESSION RECOGNITION METHOD AND APPARATUS, ELECTRONIC DEVICE, AND STORAGE MEDIUM

CROSS-REFERENCE TO RELATED APPLICATIONS

This application is a national phase application of International Application No. PCT/CN2021/079881, filed Mar. 10, 2021, which claims the benefit of and priority to Chinese Patent Application No. 202010364481.X, filed on Apr. 30, 2020, entitled "EXPRESSION RECOGNITION METHOD AND APPARATUS, ELECTRONIC DEVICE, AND STORAGE MEDIUM," the entire contents of both which are hereby incorporated by reference in their entireties herein.

TECHNICAL FIELD

The present disclosure relates to the technical field of image processing and, in particular, to an expression recognition method, an expression recognition apparatus, an electronic device, and a non-volatile computer-readable storage medium.

BACKGROUND

Expression recognition is a research hotspot in the field of pattern recognition, and it is also a difficult point in this field. Due to the complexity of human facial expressions, the accuracy of classifying expressions using machine learning methods is low. The development of deep learning provides more possibilities for the performance improvement of image pattern recognition, and thus the research on expression recognition based on deep learning technology is also a popular research in the field of facial feature recognition in recent years. However, the current expression recognition methods based on deep learning still have low accuracy.

It should be noted that the information disclosed in the background section above is only used to enhance the understanding of the background of the present disclosure, and therefore may include information that does not constitute the prior art known to those of ordinary skill in the art.

SUMMARY

According to a first aspect of the present disclosure, there is provided an expression recognition method, including:
  acquiring a face image to be recognized; and
  inputting the face image into N different recognition models arranged in sequence for expression recognition and outputting an actual expression recognition result, the N different recognition models being configured to recognize different target expression types, wherein N is an integer greater than 1;
  wherein the inputting the face image into the N different recognition models arranged in sequence for expression recognition and outputting the actual expression recognition result includes:
    inputting the face image into ith recognition model for expression recognition and outputting a first recognition result, wherein i is an integer ranging from 1 to N−1, and an initial value of i is 1;
    determining whether the first recognition result and the target expression type corresponding to the ith recognition model are the same, wherein the first recognition result is used as the actual expression recognition result and output when the first recognition result is the same as the target expression type corresponding to the ith recognition model, and the face image is input into (i+1)th recognition model for expression recognition when the first recognition result is different from the target expression type corresponding to the ith recognition model; and
    when the face image being input to Nth recognition model, expression recognition being performed on the face image by the Nth recognition model and a second recognition result being output, and the second recognition result being determined as the actual expression recognition result, wherein the Nth recognition model is configured to recognize a plurality of target expression types, and the second recognition result is one of the plurality of target expression types.

Optionally, in any two adjacent recognition models, the recognition accuracy of the former recognition model is greater than the recognition accuracy of the latter recognition model.

Optionally, each of the previous N−1 recognition models is configured to recognize one target expression type.

Optionally, the expression recognition being performed on the face image by the Nth recognition model and the second recognition result being output includes:
  processing the face image by the Nth recognition model to obtain a plurality of target expression types and a plurality of probability values corresponding thereto; and
  a maximum probability value being obtained by comparing the plurality of probability values, and the target expression type corresponding to the maximum probability value being used as the second recognition result.

Optionally, each of the recognition models includes a Gabor filter.

Optionally, each of the recognition models further includes: 16 convolutional layers, 1 global average pooling layer and 1 fully connected layer, and the convolutional layers includes 3×3 convolution kernels.

Optionally, before inputting the face image into N different recognition models arranged in sequence for expression recognition, the method further includes:
  acquiring a facial expression training data set, wherein the facial expression training data set includes: a plurality of face images and target expression types corresponding to each of the plurality of face images;
  determining a division order of each target expression type based on the proportion of the each target expression type in the facial expression training data set; and
  sequentially generating the N recognition models by training based on the facial expression training data set and the division order.

Optionally, the determining the division order of the each target expression type based on the proportion of the each target expression type in the facial expression training data set includes:
  sorting the proportions of the each target expression type in the facial expression training data set in descending order to obtain a proportion order; and
  an order of the each target expression type corresponding to the proportion order being used as the division order of the each target expression type.

Optionally, the determining the division order of the each target expression type based on the proportion of each target expression type in the facial expression training data set includes:

in the proportion of the each target expression type in the facial expression training data set, when a maximum value being greater than a proportion threshold, arranging the target expression type corresponding to the maximum value in a first place, and randomly arranging other target expression types to obtain a plurality of division orders;

performing binary classification division of the facial expression training data set according to each division order to obtain a plurality of subsets, and determining the impurity of the divided data set according to the plurality of subsets; and in the obtained impurities of the divided data set corresponding to the plurality of division orders, using the division order corresponding to the minimum value of the impurity as the division order of the each target expression type.

Optionally, the sequentially generating the N recognition models by training based on the facial expression training data set and the division order includes:

using the facial expression training data set as the current training data set;

dividing the current training data set according to jth expression type in the division order, and obtaining a first subset having the expression type of the jth target expression type, and a second subset having other target expression types other than the jth target expression type; and an initial value of j being 1;

using the first subset and the second subset as training sets to train the jth original recognition model to obtain jth recognition model, wherein the target expression type corresponding to the jth recognition model is the jth target expression type;

adding 1 to the value of j, using the second subset as the updated current training data set, and returning the step of dividing the current training data set according to the j-th target expression type in the division order, until the (N−1)th recognition model being determined; and using the current training set updated for N−1 times to train the Nth original recognition model to obtain the Nth recognition model.

Optionally, after the determining the impurity of the divided data set, the method further includes:

sorting the impurities corresponding to each division order from small to large, and using the division orders corresponding to previous L impurities as L target division orders, wherein L is an integer greater than 1;

for each target division order, according to the facial expression training data set and the target division order, training and generating a plurality of target models corresponding to the target division order; and testing the plurality of target models corresponding to each of the L target division orders through a test set, and using the plurality of target models with the highest accuracy as the N recognition models, wherein the number of the plurality of target models with the highest accuracy rate is N.

Optionally, N is 5, and the target expression types recognized by the previous four recognition models in the sequenced five recognition models are: happy, surprised, neutral, and sad; and the target expression types recognized by the fifth recognition model are: angry, disgusted, and fearful.

According to a second aspect of the present disclosure, there is provided an expression recognition apparatus, including:

an image acquisition processor configured to acquire a face image to be recognized; and an image recognition processor configured to the face image into N different recognition models arranged in sequence for expression recognition and output an actual expression recognition result, the N different recognition models being configured to recognize different target expression types, wherein N is an integer greater than 1;

wherein the image recognition processor is specifically configured to: input the face image into ith recognition model for expression recognition and output a first recognition result, wherein i is an integer ranging from 1 to N−1, and an initial value of i is 1;

determine whether the first recognition result and the target expression type corresponding to the ith recognition model are the same, wherein the first recognition result is used as the actual expression recognition result and output when the first recognition result is the same as the target expression type corresponding to the ith recognition model, and the face image is input into (i+1)th recognition model for expression recognition when the first recognition result is different from the target expression type corresponding to the ith recognition model; and when the face image being input to Nth recognition model, expression recognition being performed on the face image by the Nth recognition model and a second recognition result being output, and the second recognition result being determined as the actual expression recognition result, wherein the Nth recognition model is configured to recognize a plurality of target expression types, and the second recognition result is one of the plurality of target expression types.

Optionally, in any two adjacent recognition models, the recognition accuracy of the former recognition model is greater than the recognition accuracy of the latter recognition model.

Optionally, each of the previous N−1 recognition models is configured to recognize one target expression type.

Optionally, the image recognition processor realizes the expression recognition of the face image through the Nth recognition model and outputs the second recognition result through the following steps:

processing the face image by the Nth recognition model to obtain a plurality of target expression types and a plurality of probability values corresponding thereto; and a maximum probability value being obtained by comparing the plurality of probability values, and the target expression type corresponding to the maximum probability value being used as the second recognition result.

Optionally, each of the recognition models includes a Gabor filter.

Optionally, each of the recognition models further includes: 16 convolutional layers, 1 global average pooling layer and 1 fully connected layer, and the convolutional layers includes 3×3 convolution kernels.

Optionally, the facial expression recognition apparatus according to the embodiment of the present disclosure further includes:

a data set acquisition processor, configured to acquire a facial expression training data set, wherein the facial expression training data set includes: a plurality of face images and target expression types corresponding to each of the plurality of face images;

an order division processor, configured to determine a division order of each target expression type based on the proportion of the each target expression type in the facial expression training data set; and a model training processor, configured to sequentially generate the N recognition models by training based on the facial expression training data set and the division order.

Optionally, the order division processor is specifically configured to sort the proportions of the each target expression type in the facial expression training data set in descending order to obtain a proportion order; and an order of the each target expression type corresponding to the proportion order is used as the division order of the each target expression type.

Optionally, the order division processor is specifically configured to: in the proportion of each target expression type in the facial expression training data set, when a maximum value is greater than a proportion threshold, arrange the target expression type corresponding to the maximum value in a first place, and randomly arrange other target expression types to obtain a plurality of division orders;

perform binary classification division of the facial expression training data set according to each division order to obtain a plurality of subsets, and determining the impurity of the divided data set according to the plurality of subsets; and in the obtained impurities of the divided data set corresponding to the plurality of division orders, use the division order corresponding to the minimum value of the impurity as the division order of the each target expression type.

Optionally, the model training processor is specifically configured to: use the facial expression training data set as the current training data set;

divide the current training data set according to jth expression type in the division order, and obtain a first subset having the expression type of the jth target expression type, and a second subset having other target expression types other than the jth target expression type; and an initial value of j being 1;

use the first subset and the second subset as training sets to train the jth original recognition model to obtain jth recognition model, wherein the target expression type corresponding to the jth recognition model is the jth target expression type;

add 1 to the value of j, use the second subset as the updated current training data set, and return the step of dividing the current training data set according to the j-th target expression type in the division order, until the (N−1)th recognition model being determined; and use the current training set updated for N−1 times to train the Nth original recognition model to obtain the Nth recognition model.

Optionally, the facial expression recognition apparatus according to the embodiment of the present disclosure further includes:

a target division order selection processor, configured to the impurities corresponding to each division order from small to large, and use the division orders corresponding to previous L impurities as L target division orders, wherein L is an integer greater than 1;

a multi-model training processor, configured to, for each target division order, according to the facial expression training data set and the target division order, train and generate a plurality of target models corresponding to the target division order; and a recognition model selection processor, configured to test the plurality of target models corresponding to each of the L target division orders through a test set, and use the plurality of target models with the highest accuracy as the N recognition models, wherein the number of the plurality of target models with the highest accuracy rate is N.

Optionally, N is 5, and the target expression types recognized by the previous four recognition models in the sequenced five recognition models are: happy, surprised, neutral, and sad; and the target expression types recognized by the fifth recognition model are: angry, disgusted, and fearful.

According to a third aspect of the present disclosure, there is provided an electronic device, including: a processor; and a memory configured to store executable instructions for the processor; wherein the processor is configured to perform any one of the expression recognition methods described above by executing the executable instructions.

According to a fourth aspect of the present disclosure, there is provided a non-volatile computer-readable storage medium on which a computer program is stored, wherein any one of the expression recognition methods described above is implemented when the computer program is executed by a processor It should be understood that the above general description and the following detailed description are only exemplary and explanatory, and cannot limit the present disclosure.

BRIEF DESCRIPTION OF THE DRAWINGS

The drawings herein, which are incorporated in and constitute a part of the specification, illustrate embodiments consistent with the present disclosure, and serve to explain the principles of the present disclosure together with the description. Understandably, the drawings in the following description are only some embodiments of the present disclosure. For those of ordinary skill in the art, other drawings may be obtained based on these drawings without creative efforts.

DETAILED DESCRIPTION

Figure 1:
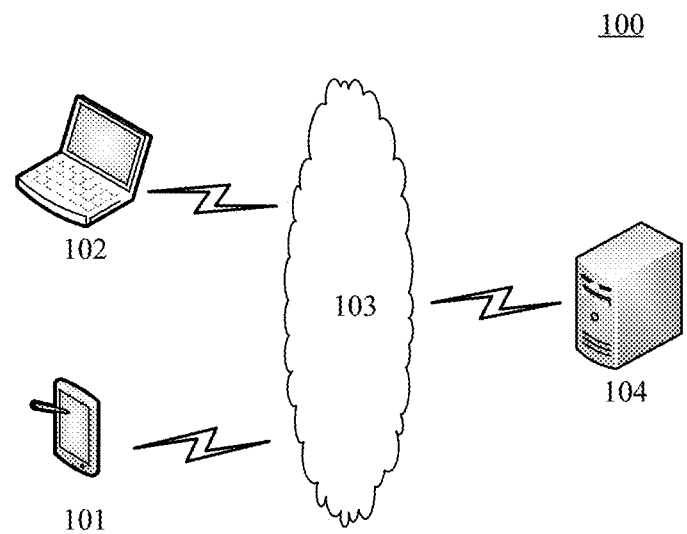
FIG. 1 shows a schematic diagram of an exemplary system architecture to which an expression recognition method and apparatus according to an embodiment of the present disclosure may be applied.

Example embodiments will now be described more fully with reference to the accompanying drawings. Example embodiments, however, can be embodied in various forms and should not be construed as limited to the examples set forth herein; rather, these embodiments are provided so that this disclosure will be thorough and complete, and will fully convey the concept of example embodiments to those skilled in the art. The described features, structures, or characteristics may be combined in any suitable manner in one or more embodiments. In the following description, numerous specific details are provided in order to give a thorough understanding of the embodiments of the present disclosure. However, those skilled in the art will appreciate that the technical solutions of the present disclosure may be practiced without one or more of the specific details, or other methods, components, devices, steps, etc. may be employed. In other instances, well-known solutions are not shown or described in detail to avoid obscuring aspects of the present disclosure.

Furthermore, the drawings are merely schematic illustrations of the present disclosure and are not necessarily drawn to scale. The same reference numerals in the drawings denote the same or similar parts, and thus repeated descriptions thereof will be omitted. Some of the block diagrams shown in the drawings are functional entities that do not necessarily correspond to physically or logically separate entities. These functional entities may be implemented in software, or in one or more hardware modules or integrated circuits, or in different networks and/or processor devices and/or microcontroller devices.

With respect to the problem of low accuracy of current facial image expression recognition, the present disclosure provides an expression recognition solution.

FIG. 1 shows a schematic diagram of a system architecture of an exemplary application environment to which an expression recognition method and apparatus according to an embodiment of the present disclosure may be applied.

As shown in FIG. 1, a system architecture 100 may include one or more of terminal devices 101 and 102, a network 103, and a server 104. The network 103 is used as a medium for providing a communication link between the terminal devices 101 and 102 and the server 104. The network 103 may include various connection types, such as wired, wireless communication links, fiber optic cables, or the like. The terminal devices 101 and 102 may be portable computers, smart phones, tablet computers, and the like. It should be understood that the numbers of terminal devices, networks and servers in FIG. 1 are only illustrative, and there may be any number of terminal devices, networks, and servers according to implementation requirements. For example, the server 104 may be a server cluster composed of multiple servers, etc.

An expression recognition method provided by an embodiment of the present disclosure is generally executed by the server 104, and accordingly, the expression recognition apparatus is generally disposed in the server 104. However, those skilled in the art can easily understand that the expression recognition method provided by the embodiment of the present disclosure may also be executed by the terminal devices 101 and 102, and correspondingly, the expression recognition apparatus may also be disposed in the terminal devices 101 and 102, which is not specifically limited in the exemplary embodiment. For example, in an exemplary embodiment, a face image to be recognized is uploaded by a user to the server 104 through the terminal devices 101 and 102, and the server 104 uses the expression recognition method provided by the embodiment of the present disclosure to process the facial image, so as to obtain an expression type of the face image, and the obtained expression type may also be sent to the terminal devices 101 and 102.

The technical solutions of the embodiments of the present disclosure are described in detail below.

As the most direct and effective way of expressing human emotional state, facial expression has always been of great research significance. Facial expression recognition refers to a process of separating a specific expression state from a given static image or dynamic video sequence, and then determining an emotional state of a research object, realizing the recognition and understanding of the facial expression by computer, and achieving human-computer interaction. Currently, the application of the facial expression recognition technology in the field of human-computer interaction mainly includes fatigue driving detection, social robots, and the like. The early research on the facial expression recognition was difficult and the progress was slow. With the outstanding achievements of deep learning in the field of computer vision in recent years, deep learning structures and theories have been rapidly introduced, resulting in significant development of expression recognition technology.

Most of the data sets used in the early deep learning network-based facial expression recognition are expressions posed by experimentalists under laboratory conditions, and the number of entities and the total amount of data are limited. With the rise of social networks and the development of retrieval technology, it has become possible to obtain massive face data from the Internet, most of the facial expressions contained therein are expressions expressed in a natural state, and most face-related applications are related to natural facial expression recognition. Different from the recognition of posed expressions, the natural facial expression recognition is more challenging and has broader application prospects.

The present disclosure provides an expression recognition method, an expression recognition apparatus, an electronic device, and a non-volatile computer-readable storage medium, which can improve the accuracy of expression recognition.

Figure 2A:
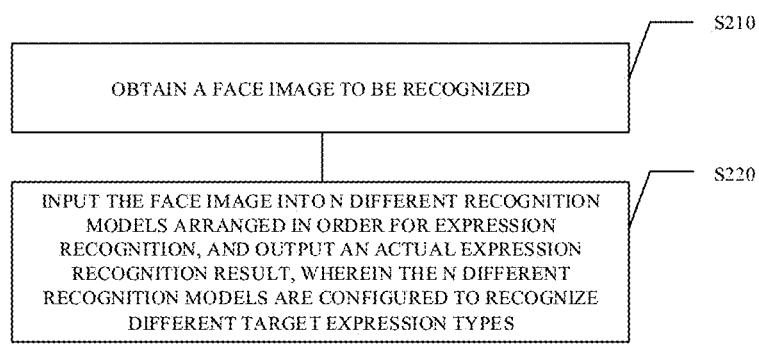
FIG. 2a shows a flow chart of an expression recognition method according to an embodiment of the present disclosure.

Referring to FIG. 2a, which shows a flowchart of an expression recognition method according to an embodiment of the present disclosure, the method includes the following steps:

Step S210, acquiring a face image to be recognized.

Step S220, inputting the face image into N different recognition models arranged in sequence for expression recognition and outputting an actual expression recognition result, the N different recognition models being configured to recognize different target expression types, wherein N is an integer greater than 1.

Figure 2B:
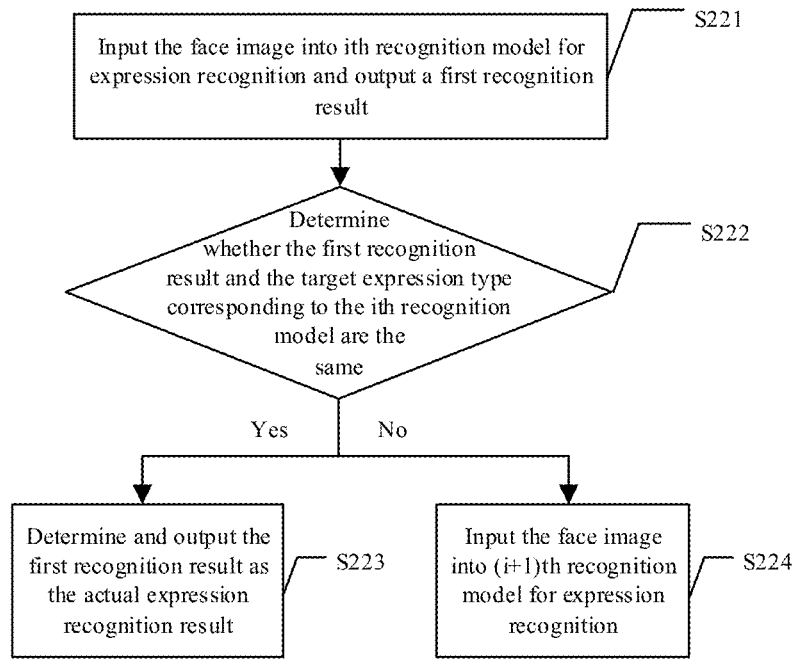
FIG. 2b shows a flow chart of performing expression recognition on a face image by N different recognition models according to an embodiment of the present disclosure.

Referring to FIG. 2b, in step S220, the following steps may be included:

Step S221, inputting the face image into ith recognition model for expression recognition and outputting a first recognition result, wherein i is an integer ranging from 1 to N−1, and an initial value of i is 1.

Step S222, determining whether the first recognition result and the target expression type corresponding to the ith recognition model are the same. When the first recognition result is the same as the target expression type corresponding to the ith recognition model, step S223 is performed; and when the first recognition result is different from the target expression type corresponding to the ith recognition model, step S224 is performed.

Step S223, the first recognition result being determined as the actual expression recognition result and output;

Step S224, inputting the face image into (i+1)th recognition model for expression recognition.

In step S224, when the face image is input to Nth recognition model, the Nth recognition model performs expression recognition on the face image and outputs a second recognition result, and the second recognition result is determined as the actual expression recognition result, wherein the Nth recognition model is configured to recognize a plurality of target expression types, and the second recognition result is one of the plurality of target expression types.

In the expression recognition method of the embodiment of the present disclosure, since the N recognition models can recognize different target expression types and each recognition model can pay more attention to the key features of a certain type of expression, the accuracy of expression type recognition may be improved through the recognition by N recognition models in sequence. In addition, each recognition model recognizes fewer target expression types, which can reduce the network complexity of each recognition model, thereby reducing the amount of computation.

The expression recognition method according to the embodiment of the present disclosure will be described in more detail below.

In step S210, the face image to be recognized is acquired.

In the embodiment of the present disclosure, the face image to be recognized may be an image including facial features of a person. For example, it may be a picture of a person stored in the terminal device, a face image obtained from the Internet, or the like.

In step S220, the face image is input into the N different recognition models arranged in sequence for expression recognition and the actual expression recognition result is output, and the N different recognition models are configured to recognize different target expression types, wherein N is an integer greater than 1.

In the embodiment of the present disclosure, each of the N recognition models may recognize the target expression type of the face image, and the N recognition models perform recognition in sequence. Each recognition model may correspond to different target expression types, that is, the target expression types recognized by each recognition model may be different. The target expression types may include: happy, surprised, neutral, sad, angry, disgusted, fearful, and the like. The present disclosure does not specifically limit the type of the target expression type.

For example, if the target expression type corresponding to the first recognition model is happy, the target expression type that can be recognized by the first recognition model is "happy", and the expression recognition result output by the first recognition model can be a happy expression or an unhappy expression, wherein the non-happy expression refers to all expressions except happy expressions. If the target expression type corresponding to the second recognition model is "surprised", the target expression type that can be recognized by the second recognition model is "surprised", and the expression recognition result output by the second recognition model may be a surprised expression or a non-surprised expression. Since the happy expression may be recognized by the first recognition model, the non-surprised expression refers to all other expressions except the happy expression and the surprised expression.

In step S221, the face image is input into the ith recognition model for expression recognition and the first recognition result is output, wherein i is an integer ranging from 1 to N−1, and an initial value of i is 1. It should be noted that, in order to reduce the complexity of the recognition model without increasing the number of recognition models, each of the previous N−1 recognition models may be configured to recognize one target expression type, that is, the first to N−1 recognition model may recognize one target expression type, and the Nth recognition model may recognize multiple target expression types. In this case, if M is the total number of target expression types that can be recognized by N recognition models, the Nth recognition model can recognize M−N+1 target expression types, where M is an integer greater than or equal to N. In an implementation of the present disclosure, for the above 7 target expression types, the number of recognition models may be 5, that is, N is 5. Among the five recognition models arranged in sequence, the target expression types recognized by the previous four recognition models are: happy, surprised, neutral, and sad; and the target expression types recognized by the fifth recognition model are: angry, disgusted, and fearful. A training method for the N recognition models will be described in detail below.

Of course, for the first to N−1 recognition model, in addition to recognizing one target expression type, multiple target expression types can also be recognized. Correspondingly, the number of target expression types that the Nth recognition model can recognize also changes. For example, the expression types that can be recognized by the first recognition model are happy and surprised, and the expression recognition result output by the first recognition model may be happy, surprised, or the like. If the probability corresponding to "happy" is the largest, the expression recognition result is happy, and the identification process ends. If the probability corresponding to "surprised" is the largest, the expression recognition result is "surprised", and the recognition process ends. If the other corresponding probabilities are the largest, expression recognition may be continued through the second recognition model, and the recognition process thereof is similar to that of the first recognition model, which will not be described in detail herein. The present disclosure takes as an example that the first to N−1 recognition models may recognize one target expression type.

Step S222, it is determined whether the first recognition result and the target expression type corresponding to the ith recognition model are the same.

In the embodiment of the present disclosure, when the first to N−1 recognition models can recognize one target expression type, the first recognition result output by the ith recognition model includes: the target expression type corresponding to the ith recognition model and other expression types other than the target expression type. Here, i is an integer of 1 to N−1. For example, the target expression type corresponding to the first recognition model is "happy", the expression recognition result output by the first recognition model may be happy or unhappy, and the first recognition result is happy or unhappy. When the first recognition result is the same as the target expression type corresponding to the ith recognition model, step S223 is performed; and when the first recognition result is different from the target expression type corresponding to the ith recognition model, step S224 is performed.

Step S223, the first recognition result is determined as the actual expression recognition result and output.

Specifically, when the first recognition result is the same as the target expression type corresponding to the ith recognition model, it means that the ith recognition model can determine the expression type of the face image, and the first recognition result can be directly used as the actual expression recognition result and output.

Step S224, the face image is input into the (i+1)th recognition model for expression recognition.

Specifically, when the first recognition result is different from the target expression type corresponding to the ith recognition model, it means that the ith recognition model cannot determine the expression type of the face image, and the expression recognition may be performed by the next recognition model. When the first to N−1 recognition models can recognize one target expression type, the recognition process of the first to N−1 recognition models is similar, and details are not repeated herein.

Figure 3:
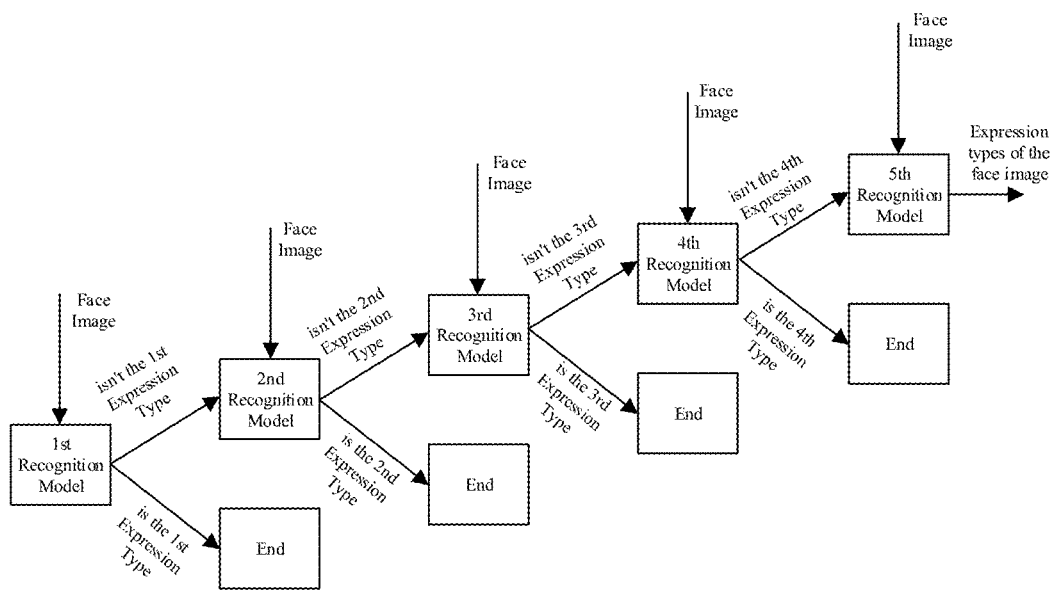
FIG. 3 shows a schematic diagram of a process of recognizing a face image according to an embodiment of the present disclosure.

FIG. 3 shows a schematic diagram of a process of recognizing a face image according to an embodiment of the present disclosure, referring to FIG. 3, the ith expression type represents the expression type corresponding to the ith recognition model, and i is an integer from 1 to 5. Specifically, the recognition process may be as follows: first, the face image is processed by the first recognition model, and if it is determined that the expression type of the face image is the target expression type corresponding to the first recognition model, the recognition process ends. If the expression type of the face image is not the target expression type corresponding to the first recognition model, the face image is processed by the second recognition model. If it can be determined through the second recognition model that the expression type of the face image is the target expression type corresponding to the second recognition model, the recognition process ends. If the expression type of the face image is not the expression type corresponding to the second recognition model, the face image is processed by the third recognition model, and so on, until the expression type of the face image is determined.

It can be understood that, in the case where none of the first to N−1 recognition models recognize the expression type of the face image, the expression type of the face image can be determined by the Nth recognition model. In step S224, when the face image is input to the Nth recognition model, the Nth recognition model performs expression recognition on the face image and the second recognition result is output, and the second recognition result is used as the actual expression recognition result, wherein the Nth recognition model is configured to recognize a plurality of target expression types, and the second recognition result is one of the plurality of target expression types.

Specifically, the face image is processed by the Nth recognition model to obtain a plurality of target expression types and a plurality of probability values corresponding thereto. A maximum probability value is obtained by comparing the plurality of probability values, and the target expression type corresponding to the maximum probability value is used as the second recognition result. For example, if the Nth recognition model can recognize three target expression types, after the face image is input into the Nth recognition model, a probability vector containing three elements can be obtained, and the three elements respectively indicate the probability that the expression type of the face image is the three target expression types. At this time, the target expression type corresponding to the maximum probability value in the probability vector may be used as the expression type of the face image.

It should be noted that each of the recognition models may contain a Gabor filter. That is, in each recognition model, the face image may be preprocessed by the Gabor filter to obtain the preprocessed image. Wherein the two-dimensional Gabor basis function can well describe the receptive field characteristics of a pair of simple visual neurons in the primary visual system of mammals. With the development of wavelet transform and neurophysiology, Gabor transform gradually evolved into the form of two-dimensional Gabor wavelet. The Gabor filter has strong robustness to the changes of brightness and contrast of the image and the change of face pose, and it expresses the most useful local features for face recognition, which can improve the robustness of the network to illumination and face pose. Therefore, it can be widely used in computer vision and texture analysis. The Gabor filter function is expressed as follows:

$$g(x, y; \lambda, \theta, \phi, \sigma, \gamma) = e^{-\frac{1}{2}\left[\left(\frac{x'}{\sigma}\right)^2 + \left(\frac{\gamma y'}{\sigma}\right)^2\right]} e^{i\left(\frac{2\pi x'}{\lambda} + \phi\right)}$$

Wherein x'=x cos θ+y sin θ, y'=−x sin θ+y cos θ, (x,y) represents coordinates of a two-dimensional space image;

λ represents the wavelength, the value λ of is in pixels, usually greater than or equal to 2, but not greater than one-fifth of the input image size;

θ represents the direction, this parameter specifies the direction of the parallel stripes of the Gabor function, and its value is 0 to 2π;

φ represents the phase offset, and its value ranges from −π to π. Wherein −π/2 and π/2 correspond to antisymmetric functions;

γ is the aspect ratio, which represents the spatial aspect ratio and determines the ellipticity of the shape of the Gabor function. When γ=1, the shape is round. When γ<1, the shape elongates with the direction of the parallel stripes. Typically, the value of γ may be 0.5.

σ represents the standard deviation of the Gaussian factor of the Gabor function, the value of σ cannot be set directly, it may vary with the bandwidth b. The half-response spatial frequency bandwidth b of the Gabor filter is related to the ratio of π/λ, the bandwidth b is a positive real number, and the value of b may be 1 and the like. At this time, the relationship between the standard deviation and the wavelength is: π=0.56λ.

Figure 4:
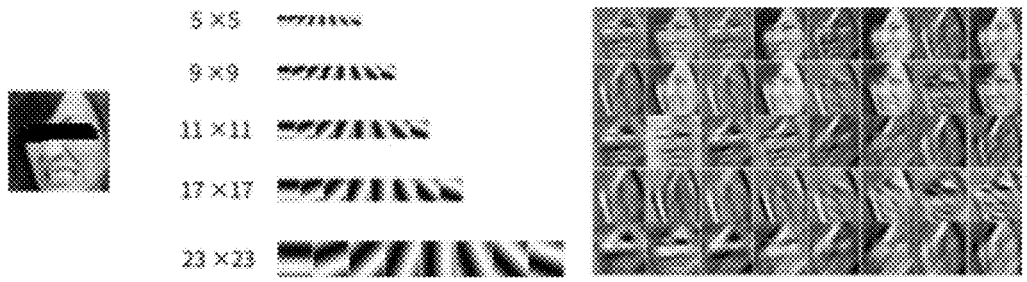
FIG. 4 shows a response graph of a set of filters and a schematic diagram of a filtering result of an input face image according to an embodiment of the present disclosure.

In the application of facial feature expression, facial features may be described by a set of filters consisting of 40 filters in 5 scales (5×5, 9×9, 11×11, 17×17, and 23×23) and 8 directions (8 directions selected between 0 and 2π). 5 scales represent the size of the kernel of the filter. The response graph of the set of filters and the filtering result of the input face image are shown in FIG. 4. It can be seen that different filters have different filtering results on the face image.

After the face image is preprocessed by Gabor filter, the preprocessed image may be further processed by 16 convolutional layers and 3 fully connected layers. For example, the preprocessed image may be processed by Visual Geometry Group (VGG)-19 network. VGG-19 contains 16 convolutional layers and 3 fully connected layers, maximum pooling may be used between layers, and the activation function of all hidden layers may use Rectified Linear Unit (ReLU) function.

Wherein the VGG network is a deep convolutional neural network developed by researchers from the Visual Geometry Group of Oxford University and Google Deep Mind. Its main contribution is to show the relationship between the depth of the convolutional neural network and its performance. The experimental results confirm that increasing the depth of the network can affect the final performance of the network to a certain extent. VGG is widely used to extract image features. In the embodiment of the present disclosure, in addition to processing the preprocessed image through VGG-19, of course, the preprocessed image may also be processed through VGG-16 or other networks, which is not limited herein.

Figure 5:
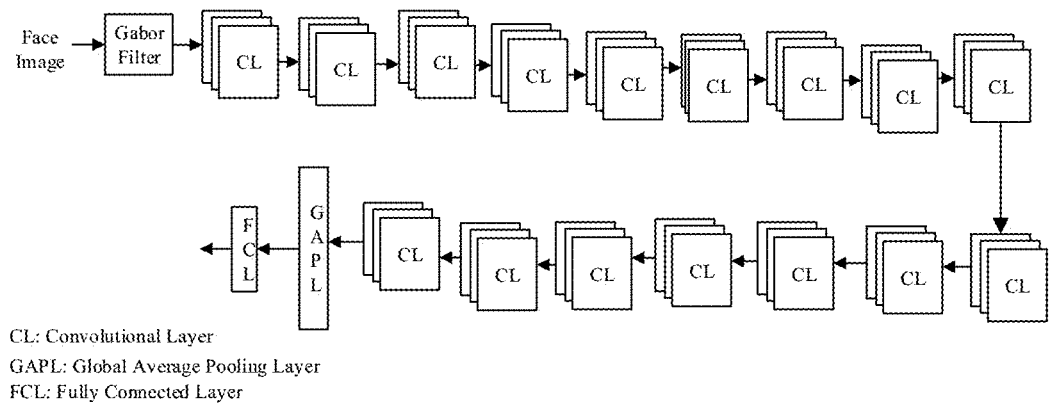
FIG. 5 shows a schematic diagram of s network structure of a recognition model according to an embodiment of the present disclosure.
Figure 6:
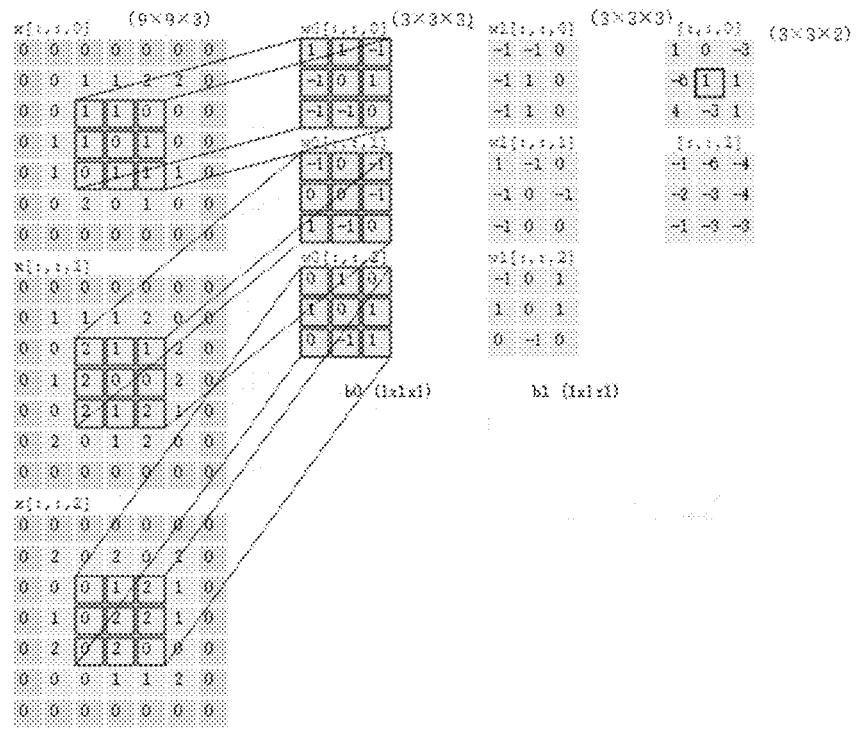
FIG. 6 shows a schematic diagram of a convolution operation of a convolution layer according to an embodiment of the present disclosure.

In the embodiment of the present disclosure, 2 fully connected layers in the 16 convolutional layers and 3 fully connected layers may also be replaced with 1 global average pooling layer to reduce model parameters. That is, the preprocessed image may be processed through 16 convolutional layers, 1 global average pooling layer, and 1 fully connected layer. FIG. 5 shows a network structure of a recognition model according to an embodiment of the present disclosure. It can be seen that the first layer is the Gabor filter, which is followed by 16 convolutional layers, 1 global average pooling layer, and 1 fully connected layer.

Wherein an example of the convolution operation in the convolution layer is shown in FIG. 6. Assuming that the size of the convolution kernel is set to 3×3, the size of the input image is 7×7×3, and one pixel is filled on both sides of the image, the size of the obtained image is 9×9×3, and the number of output channels is 2, also known as outputting 2 feature maps. During convolution, convolution operations are performed on the feature maps of the 3 channels respectively. The convolution kernel of each channel is 3×3. The corresponding positions are multiplied and added together, and then an offset value b0 is added to obtain the processed value. Since the number of output channels is 2, there are two convolution parameters w0 and w1, and 2 output features are obtained.

After the convolution operation, using the Batch Normalization (BN) layer can choose a larger learning rate, so that the training speed grows quickly and has fast convergence. The BN layer normalizes each neuron, and the input is convolved to obtain a series of feature maps. Assuming that the number of samples is m, the input data of a certain layer of the network may be expressed as a four-dimensional matrix (m, f, w, h), where f is the number of feature maps (that is, the number of channels), w and h are the width and height of the feature map, respectively. In the convolutional neural network, each feature map may be regarded as a feature processing (a neuron), so when using BN, the size of the samples is: m*w*h. Thus, for each feature map, there is only one pair of learnable parameters: γ and β. The mean and variance of all neurons in a feature map are calculated, and then the neurons in this feature map are normalized. The formula of the BN layer is as follows.

$$\mu_i = \frac{1}{m*w*h}\sum_m \sum_{w,h} x_{m,w,h};$$

$$\sigma_i^2 = \frac{1}{m*w*h}\sum_m \sum_{w,h} (x_{m,w,h}-\mu_i)^2;$$

$$\hat{x}_{m,w,h} = \frac{x_{m,w,h}-\mu_i}{\sqrt{\sigma_i^2+\epsilon}};$$

$$y_{m,w,h} = \gamma_i * \hat{x}_{m,w,h} + \beta_i;$$

Wherein $i \in (1, 2, \ldots, f)$ represents the ith input feature map, $x_{m,w,h}$ represents the input pixel whose coordinate position is w,h in the mth sample, $y_{m,w,h}$ represents the corresponding output pixel, and $\gamma_i$ and $\beta_i$ represents a pair of learnable parameters of i. $\mu_i$ represents the mean of each channel, $\sigma_i^2$ represents the variance of each channel, $\hat{x}_{m,w,h}$ represents the batch-normalized eigenvalue, and $\epsilon$ represents a small value such that the denominator is non-zero The ReLU function is an activation function and is a nonlinear function. The convolution operation is a linear operation, and after using a nonlinear function, the neurons are activated. The effectiveness of ReLU is reflected in two aspects: overcoming the problem of vanishing gradients and speeding up training. The formula of the ReLU function is:

$$f(x)=\max(0,x);$$

wherein x represents the input vector from the previous layer of neural network.

Figure 7:
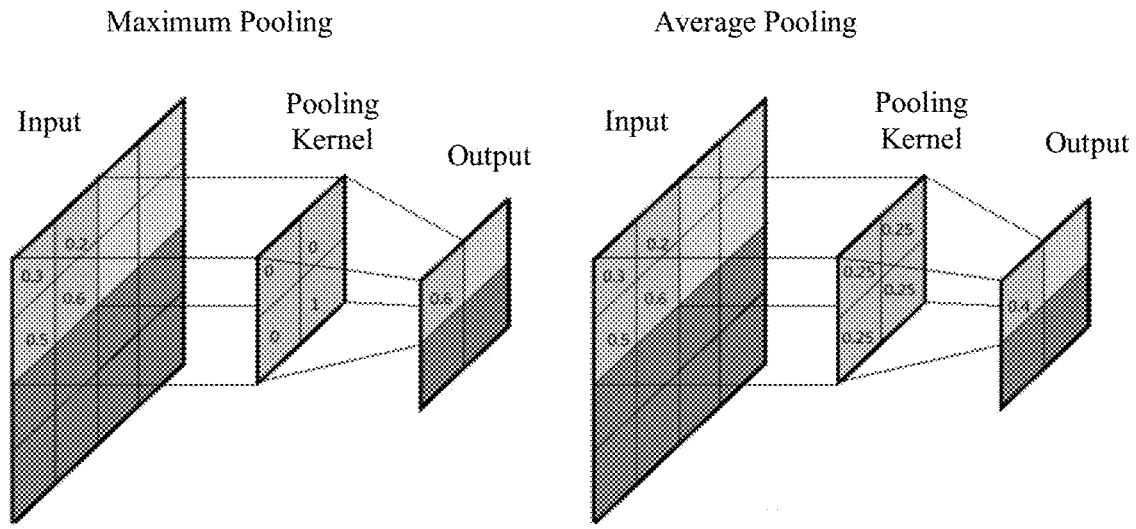
FIG. 7 shows a schematic structural diagram of pooling layers according to an embodiment of the present disclosure.

With respect to FIG. 7, which is a schematic diagram of pooling layers, the function of the pooling layers is to reduce parameters and is generally placed after the convolutional layer. Therefore, the pooling layer pools the output of the convolutional layer, which is divided into maximum pooling and average pooling. Global average pooling is to average all the values of a feature map of size h×w into values of size 1×1. In this way, parameters may be minimized.

Figure 8:
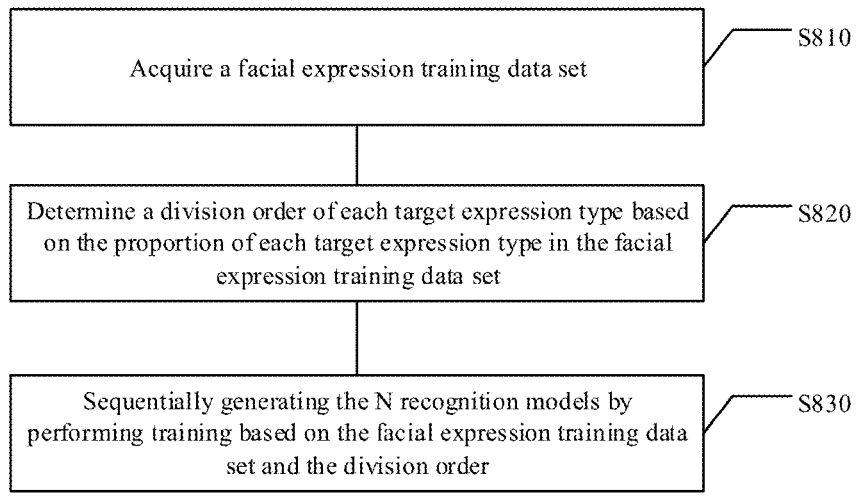
FIG. 8 shows a flowchart of generating a plurality of recognition models according to an embodiment of the present disclosure.

Before the embodiment of FIG. 2, the network may be trained through a training set to generate the above-mentioned N recognition models. Referring to FIG. 8, which shows a flowchart of generating a plurality of recognition models according to an embodiment of the present disclosure, the following steps may be included:

Step S810, acquiring a facial expression training data set, wherein the facial expression training data set includes: a plurality of face images and target expression types corresponding to each of the plurality of face images.

In the embodiment of the present disclosure, the facial expression training data set may be FER2013 or other expression data sets, wherein FER2013 is a data set with a large amount of data in expression recognition, including 7 basic expressions (happy, surprised, neutral, sad, anger, disgusted and fearful). When the facial expression training data set is FER2013, each target expression type is the above 7 basic expressions. Of course, different expression data sets may classify expressions differently, and correspondingly, the corresponding target expression types may also be different.

Step S820: determining a division order of each target expression type based on the proportion of each target expression type in the facial expression training data set.

Under normal circumstances, the amount of data corresponding to each target expression type in the facial expression training data set is uneven, so if a model is directly trained and generated based on the facial expression training data set, the accuracy of the model for recognizing the expression type of the face image is low. In the embodiment of the present disclosure, by analyzing the uneven distribution of the facial expression training data set, the facial expression training data set can be divided based on the concept of a decision tree, and the above N recognition models may be generated by training.

Wherein the decision tree is a classifier, which is composed of nodes and branches. The terminal nodes that cannot be divided are called leaf nodes. Each non-terminal node corresponds to a segmentation attribute $a^i$. The selection of node attributes is a crucial part of the decision tree construction. For a data set S with D attributes $a^i$ (i=1, ..., D), the task of classification is to find a classifier h: $A^1 \times \ldots \times A^D \to \{1, \ldots, C\}$ and assign each sample $s_k=(v_k,y_k)$ in the data set into the corresponding category $c \in \{1, \ldots, C\}$. Wherein $A^i$ is the possible value of attribute $a^i$, k=1, ..., N, and N is the number of samples in the data set.

The purer the data set divided based on the decision tree, the higher the accuracy of the expression type recognition of the model trained by the data set, and the impurity of the data set under different division conditions may be calculated here. The lower the impurity, the purer the data set, so the network can be trained with the division order that makes the data set less impurity to generate multiple recognition models. Since the selection of the attribute of each node is based on an impurity, the impurity of each attribute can be calculated, and the attribute with lower impurity is used to divide the node into multiple child nodes. Each of the child nodes is connected to the parent node through the branch, and each branch corresponds to a value associated with the attribute $a^i$.

The impurity may be calculated through the Gini index in the present disclosure. It is found through experiments that using the expression type with a large proportion of samples to segment the data set can reduce the impurity of the data set faster than with a small proportion. For example, the proportion of "happy" in the facial expression training data set is much larger than the proportion of "disgusted", and the Gini index when dividing the facial expression training data set by attribute $a^{Happy}$ is smaller than the Gini index when dividing by attribute $a^{Disgust}$. $a^{Happy}$ represents the ideal attribute, which can split the facial expression training data set into two nodes, one of which is a leaf node containing only "happy", and the other node is a non-leaf node containing other expression types except "happy". In addition, when divided by various attributes in sequence, the Gini index gradually decreases. For example, $a^{Happy} \to a^{Surprise} \to a^{Neutral} \to a^{Sad}$ means that the four attributes are divided in sequence. The Gini index under different division methods may be seen in Table 1. It can be seen that the Gini index of FER2013 when it is not divided is 0.827, and the Gini index when dividing the facial expression training data set by attribute $a^{Happy}$ is smaller than the Gini index when dividing by attribute $a^{Disgust}$. The Gini index gradually decreases when various attributes are divided in sequence. That is, the division order is different, and the corresponding Gini index is also different.

TABLE 1

| Number | division methods | Gini index |
|---|---|---|
| 0 | FER2013 | 0.827 |
| 1 | $a^{Disgust}$ | 0.681 |
| 2 | $a^{Happy}$ | 0.601 |
| 3 | $a^{Happy} \to a^{Surprise}$ | 0.484 |
| 4 | $a^{Disgust} \to a^{Fear} \to a^{Surprise} \to a^{Anger}$ | 0.388 |
| 5 | $a^{Happy} \to a^{Neutral} \to a^{Sad} \to a^{Surprise}$ | 0.163 |
| 6 | $a^{Happy} \to a^{Surprise} \to a^{Neutral} \to a^{Sad}$ | 0.163 |
| 7 | $a^{Happy} \to a^{Neutral} \to a^{Sad} \to a^{Anger}$ | 0.146 |

Wherein, when the root node data set S is divided into multiple subsets $S_q$ according to the attribute $a^i$, the impurity of each subset can be determined by the Gini index, and the weighted average of the impurity of the multiple subsets can be used as the impurity of the divided data set. Specifically, it can be calculated by calculation formula of the impurity of the data set:

$$\text{Gini\_index} = \sum_{q=1}^{r} \frac{|S_q|}{|S|} Gini(S_q)$$

Wherein Gini_index represents the Gini index of the data set S, r represents the number of subsets, $|S_q|$ represents the number of samples in the data set $S_q$, $|S|$ represents the number of samples in the data set S, and $Gini(S_q)$ represents the Gini index of the data set $S_q$, which is defined as follows:

$$Gini(S_q) = 1 - \Sigma_{c=1}^{C} (p_c^q)^2;$$

wherein $$p_c^q = \frac{\Sigma_{m=1}^{|s_q|} [y_m = c]}{|s_q|}$$

denotes the probability of category c in the subset $S_q$.

Since the smaller the Gini index, the purer the data set, the Gini index is 0 when all the samples belong to the same category; and the Gini index reaches the maximum when all the samples are evenly distributed in all categories.

In an implementation of the present disclosure, directly according to the above conclusion, the proportions of each target expression type in the facial expression training data set may be sorted in descending order to obtain the proportion order; and an order of the each target expression type corresponding to the proportion order may be used as the division order of the each target expression type. It is assumed that the proportion of each target expression type in the facial expression training data set is sorted in the descending order: happy proportion, surprised proportion, neutral proportion, sad proportion, angry proportion, disgusted proportion, and fearful proportion, then the division order of each target expression type is: happy, surprised, neutral, sad, angry, disgusted and fearful.

It can be understood that, after the facial expression database is divided according to the above division order, the Gini index of the divided facial expression training data set will be relatively low. Even if the division method is not the optimal division method, by dividing the facial expression training data set through this division method, the recognition model which is generated by training can also improve the recognition accuracy of the expression type of the face image.

Figure 9:
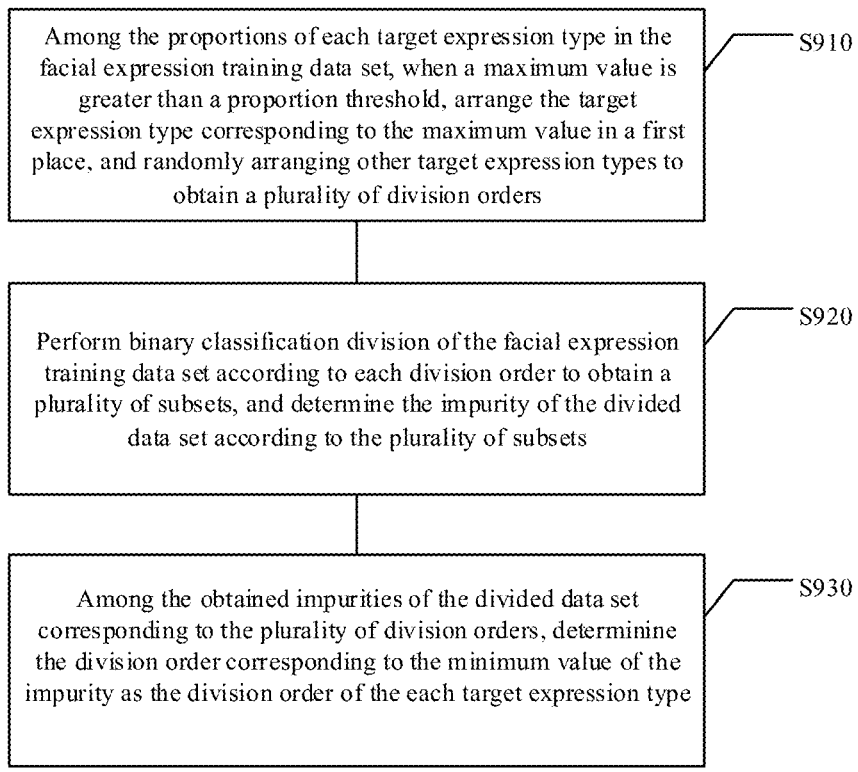
FIG. 9 shows another flowchart of determining a division order of various expression types according to an embodiment of the present disclosure.

Referring to FIG. 9, which shows another flowchart of determining a division order of various expression types according to an embodiment of the present disclosure, the following steps may be included:

Step S910, in the proportion of each target expression type in the facial expression training data set, when a maximum value being greater than a proportion threshold, arranging the target expression type corresponding to the maximum value in a first place, and randomly arranging other target expression types to obtain a plurality of division orders.

As mentioned above, the amount of data corresponding to each target expression type in the facial expression training data set is uneven. For example, "happy" accounts for a large proportion of people's daily expressions, other expressions such as "surprised" and "neutral" are relatively rare, and the proportion of "happy" may be much higher than that of "surprised" and "neutral". At this time, according to the conclusion of Table 1, during the division, "happy" may be arranged in the first place. Wherein the proportion threshold may be set according to the actual situation, which is not limited herein. For example, it may be 40%, 50%, or the like.

Sequentially, other expression types may be randomly arranged according to the proportion of other expression types. For example, in the case where the proportion of other expression types such as "surprised" and "neutral" is relatively uniform, other expression types may be randomly arranged to determine the plurality of division orders. Of course, the expression type in a second place may also be determined in the same manner as in step S910. For example, "surprised" may be arranged in the second place when the proportion of "surprised" is in the second place and is greater than another proportion threshold. Alternatively, the arrangement is performed in other ways, so that the plurality of division orders may be obtained.

Step S920, performing binary classification division of the facial expression training data set according to each division order to obtain a plurality of subsets, and determining the impurity of the divided data set according to the plurality of subsets.

After the division order is determined, the facial expression training data set may be divided. It is supposed that the order of division is: happy, surprised, neutral, sad, angry, disgusted, and fearful. Then, the facial expression training data set may be divided into the data set corresponding to "happy", and the data set corresponding to other expression types except "happy". Then, the data set corresponding to other expression types except "happy" may be divided into the data set corresponding to "surprised", and the data set corresponding to other expression types except "surprised", and so on, the plurality of data sets may be obtained.

It should be noted that, when dividing the facial expression training data set, each expression type may correspond to one data set, or the plurality of expression types may correspond to one data set, which is not limited herein. Generally, the expression type with a higher proportion may be corresponded to one data set, and the plurality of expression types with a lower proportion may be corresponded to one data set. For example, "happy", "surprised", "neutral", and "sad" may be corresponded to one data set, and "angry", "disgusted", and "fearful" may be corresponded to one data set. Then, the divided subsets are respectively: the data set corresponding to "happy", the data set corresponding to "surprised", the data set corresponding to "neutral", the data set corresponding to "sad", and the data set corresponding to "angry", "disgusted" and "fearful", including a total of five subsets. Accordingly, five recognition models may be obtained.

Finally, the impurity of the divided facial expression training data set may be calculated according to the above calculation formula of the impurity of the data set.

Step S930, in the obtained impurities of the divided data set corresponding to the plurality of division orders, using the division order corresponding to the minimum value of the impurity as the division order of each target expression type.

In the embodiment of the present disclosure, according to the conclusions in Table 1, the division order corresponding to the minimum value of the impurity may be used as the division order of each target expression type. In this way, the accuracy of the trained model may be improved according to the division order.

Step S830, sequentially generating the N recognition models by training based on the facial expression training data set and the division order.

Figure 10:
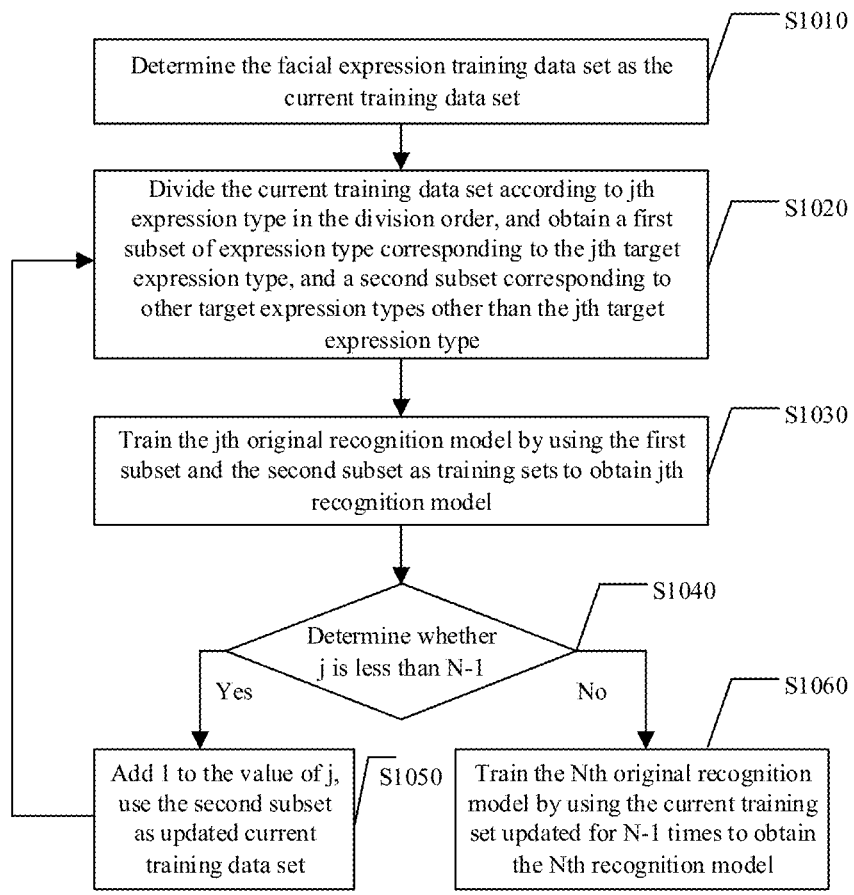
FIG. 10 shows a flowchart of establishing recognition models according to an embodiment of the present disclosure.

After the division order is determined, the order for establishing the recognition models is determined. Referring to FIG. 10, which shows a flowchart of establishing recognition models according to an embodiment of the present disclosure, the following steps may be included:

Step S1010, using the facial expression training data set as the current training data set.

Step S1020, dividing the current training data set according to jth expression type in the division order, and obtaining a first subset having the expression type of the jth target expression type, and a second subset having other target expression types other than the jth target expression type; and an initial value of j being 1.

Because the impurity is calculated after dividing the facial expression training data set into the plurality of subsets in the above step S920, the division method of the facial expression training data set is the division method corresponding to the division order corresponding to the minimum impurity value. For example, when the first expression type is "happy", the facial expression training data set may be divided into a first subset (that is, the data set corresponding to "happy") and a second subset (that is, the data set corresponding to other expression types except "happy"). When the second expression type is "surprised", the data set corresponding to other expression types except "happy" may be divided into the data set corresponding to "surprised" and the data set corresponding to other expression types except "surprised", and so on.

Step S1030, using the first subset and the second subset as training sets to train the jth original recognition model to obtain jth recognition model, wherein the expression type corresponding to the jth recognition model is the jth expression type.

After each division, the first subset and the second subset may be directly used as training sets to train the jth original recognition model to obtain the corresponding recognition model. Specifically, the neural network training process may be as follows: first, the original recognition model is determined, and network parameters in the original recognition model may be preset. Then in the training process, loss function may be continuously calculated according to the principle of back propagation through a gradient descent method, and the network parameter values may be updated according to the loss function, wherein the loss function may be used to estimate the inconsistency between a predicted value and a real value. After the training is completed, the trained recognition model is obtained.

Step S1040, determining whether j is less than N−1. If j is less than N−1, step S1050 is executed, otherwise, if j is equal to N−1, step S1060 is executed.

Specifically, it may be determined whether the jth recognition model determined in step S1030 is the (N−1)th recognition model. If it is not the (N−1)th recognition model, it means that the training of the previous (N−1)th recognition models has not been completed, and the cycle process is continued. If it is the (N−1)th recognition model, it means that the training of the previous (N−1)th recognition models is completed, and the Nth recognition model is generated by training through the following step S1060.

Step S1050, adding 1 to the value of j, using the second subset as the updated current training data set, and returning to step S1020.

Step S1060, using the current training set updated for N−1 times to train the Nth original recognition model to obtain the Nth recognition model.

Specifically, after the above cycles, the expression types in the current training set after N−1 updates are: remaining expression types after the jth expression type. Neural network training may be performed based on the mapping relationship between the face images in the second subset and the remaining expression types to obtain the last recognition model.

It should be noted that when training N recognition models, in addition to training in sequence as shown in FIG. 10, on the premise that the correct training set is selected according to the division order, it is also possible to train any recognition model first, and then train other recognition models. That is, the present disclosure does not limit the training order of the N recognition models.

It can be understood that, when training each recognition model, the impurity of the data set used by the previous recognition model is generally smaller than the impurity of the data set used by the latter recognition model. Therefore, in any two adjacent recognition models, the recognition accuracy of the former recognition model is greater than the recognition accuracy of the latter recognition model.

It should be noted that in the training process, the loss function for network optimization may be a cross entropy loss function. Of course, it also may be other loss functions. In a Softmax layer, Softmax is a function that converts an array into a probability distribution. It is assumed that $x_i$ is the ith element in the array, the output of Softmax is $S_i$, then $$S_i = \frac{e^{x_i}}{\sum_j e^{x_j}};$$

wherein $\Sigma_j S_j = 1$,
the objective function of SoftmaxLoss is the cross entropy function, namely $$softmaxLoss = -\sum_j t_j * \ln S_j$$

wherein $t_j$ is a real label. When predicting the jth sample, it may be considered that $t_j=1$, $t_{i \ne j}=0$, and the loss function may be simplified as:

softmaxLoss=−ln $S_j$;

When training recognition models, mini-batch stochastic gradient descent may be used as an optimizer. Momentum, base learning rate, batch size, weight decay coefficient may be set to 0.9, 0.05, 32, 0.0005, respectively. When the training loss does not decrease for 10 epochs, the learning rate is reduced to one-tenth of the original learning rate. In the present disclosure, PyTorch (PyTorch is an open source Python machine learning library, based on Torch, for applications such as natural language processing) may be used for training, and each model may be trained for 300 epochs. When a complete data set passes through the neural network once and returns once, the process is called an epoch, and bachsize represents the number of data sets that pass through the neural network each time.

Figure 11:
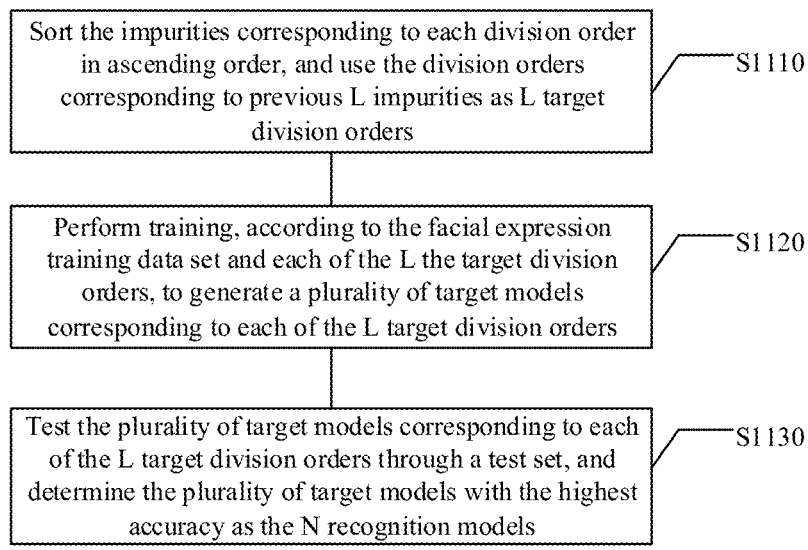
FIG. 11 shows a flowchart of generating a plurality of target models according to an embodiment of the present disclosure.

In yet another implementation of the present disclosure, a division manner capable of reducing the Gini index may also be simulated through deep learning. Wherein deep learning is a complex machine learning algorithm, and the results achieved by deep learning in speech and image recognition surpass prior related arts. Referring to FIG. 11, which shows a flowchart of generating a plurality of target models according to an embodiment of the present disclosure. After the above step S920, the following steps may also be performed:

Step S1110: sorting the impurities corresponding to each division order from small to large, and using the division orders corresponding to previous L impurities as L target division orders, wherein L is an integer greater than 1.

It should be noted that, in the embodiment of the present disclosure, in addition to directly using the division order corresponding to the minimum impurity value as the division order of each target expression type, L division orders with relatively smaller impurity may also be selected. The generation process of the recognition models is simulated by the L division orders, and the recognition model with the highest accuracy rate is selected as the final recognition model.

Step S1120, for each target division order, according to the facial expression training data set and the target division order, training and generating a plurality of target models corresponding to the target division order.

In the embodiment of the present disclosure, for each target division order, according to the facial expression training data set and the target division order, the method for training and generating the plurality of target models corresponding to the target division order may refer to the steps shown in FIG. 10, which is not repeated herein.

Step S1130: testing the plurality of target models corresponding to each of the L target division orders through a test set, and using the plurality of target models with the highest accuracy as the N recognition models, wherein the number of the plurality of target models with the highest accuracy rate is N.

Figure 12:
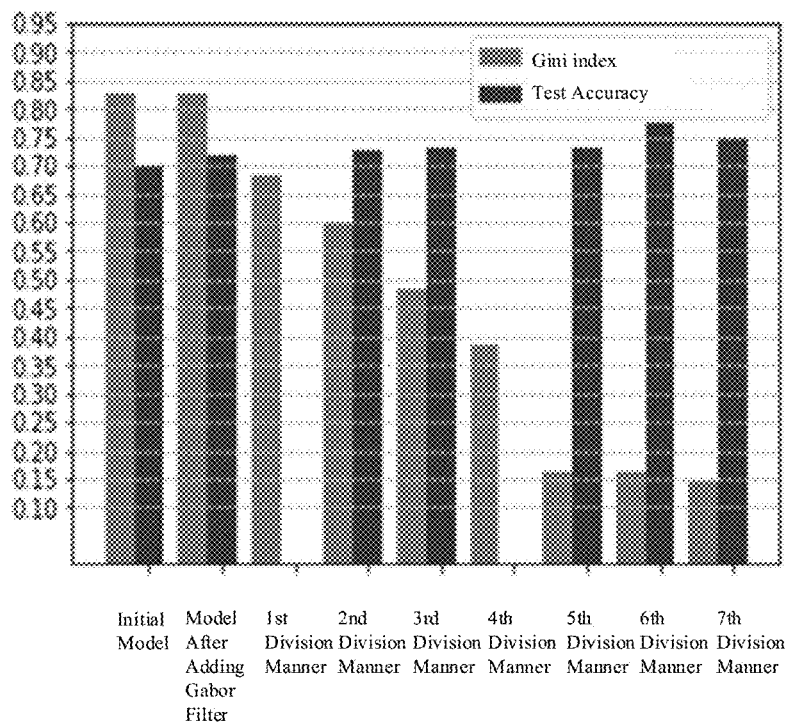
FIG. 12 shows a schematic diagram of the Gini index and accuracy of a model under different division orders according to an embodiment of the present disclosure.

It should be noted that, for each target division order, the plurality of target models may be generated by training, wherein the number of target models generated by each target division order may be different. Then, the accuracy of the plurality of target models corresponding to each target division order may be verified through the test set. The accuracy of the plurality of target models refers to the accuracy of the plurality of target models as a whole. Referring to FIG. 12, which shows a schematic diagram of the Gini index and accuracy of a model under different division orders according to an embodiment of the present disclosure. It can be seen that, the introduction of the Gabor filter improves the accuracy of the model by 2%, compared with the initial model. The various division methods in the drawing correspond to the division methods in Table 1. Since the model corresponding to the sixth division method has the highest accuracy, the recognition model corresponding to the sixth division method may be used as the final recognition model.

It should be noted that, from the overall trend, it can be seen that as the Gini index decreases, the accuracy increases accordingly, and the model without accuracy is seriously over-fitted. Of course, in some scenarios, when the Gini index decreases, the accuracy may also decrease. For example, the accuracy rate corresponding to the sixth division method is higher than the accuracy rate corresponding to the seventh division method.

In the embodiment of the present disclosure, after the plurality of recognition models are determined, the acquired face images may be recognized by using the plurality of recognition models. It is assumed that the number of final recognition models is 5, the expression types that can be recognized are: happy; surprised; neutral; sad; angry, disgusted, and fearful. The face image is input into the first recognition model for determination. If the recognition result is "happy", the expression type of the face image is determined as "happy", and the recognition is stopped. If the recognition result is not "happy", the face image is continued input into the second recognition model. If the recognition result is "surprised", the expression type of the face image is determined to be "surprised", and the recognition is stopped. If the recognition result is not "surprised", the face image is continued input into the third recognition model. If the recognition result is "neutral", the expression type of the face image is determined to be "neutral", and the recognition is stopped. If the recognition result is not "neutral", the face image is continued input into the fourth recognition model. If the recognition result is "sad", the expression type of the face image is determined to be "sad", and the recognition is stopped.

If the recognition result is not "sad", the face image is continued input into the fifth recognition model, and the recognition result of the input image is determined according to the output probability of the network. If the output probability of "angry" is the largest, it is determined to be "angry"; and if the probability of "disgusted" is the largest, it is determined to be "disgusted", otherwise it is determined to be "fearful".

It can be seen that, in the expression recognition method according to the embodiment of the present disclosure, by analyzing the uneven distribution of the facial expression training data set, calculating the impurity of the data set under different division methods based on the concept of the decision tree, and using the division order to make the data set less impurity to train the network, the accuracy of expression recognition may be improved. By using the Gabor filter for preprocessing in each recognition model, the robustness of the network to illumination and facial pose may be improved, and the accuracy of the model may be further improved.

It should be noted that although the various steps of the methods of the present disclosure are depicted in the drawings in a particular order, this does not require or imply that the steps must be performed in that particular order, or that all illustrated steps must be performed to achieve the desired results. Additionally or alternatively, certain steps may be omitted, multiple steps may be combined into one step for execution, one step may be decomposed into multiple steps for execution, and/or the like.

Figure 13:
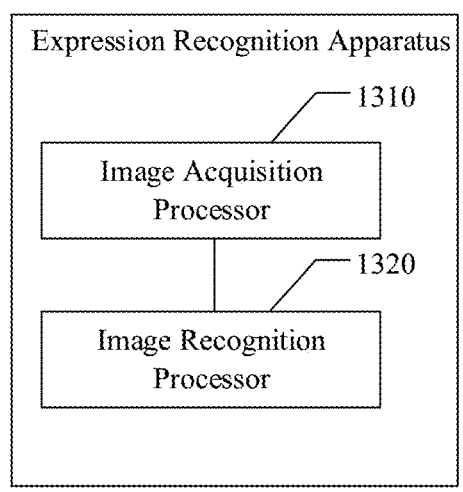
FIG. 13 shows a schematic structural diagram of an expression recognition apparatus according to an embodiment of the present disclosure.

Further, in the example embodiment, an expression recognition apparatus 1300 is further provided. Referring to FIG. 13, which shows a schematic structural diagram of an expression recognition apparatus according to an embodiment of the present disclosure, the expression recognition apparatus includes:

an image acquisition processor 1310, configured to acquire a face image to be recognized; and an image recognition processor 1320, configured to the face image into N different recognition models arranged in sequence for expression recognition and output an actual expression recognition result, the N different recognition models being configured to recognize different target expression types, wherein N is an integer greater than 1;

wherein the image recognition processor is specifically configured to: input the face image into ith recognition model for expression recognition and output a first recognition result, wherein i is an integer ranging from 1 to N−1, and an initial value of i is 1;

determine whether the first recognition result and the target expression type corresponding to the ith recognition model are the same, wherein the first recognition result is used as the actual expression recognition result and output when the first recognition result is the same as the target expression type corresponding to the ith recognition model, and the face image is input into (i+1)th recognition model for expression recognition when the first recognition result is different from the target expression type corresponding to the ith recognition model; and when the face image being input to Nth recognition model, expression recognition being performed on the face image by the Nth recognition model and a second recognition result being output, and the second recognition result being determined as the actual expression recognition result, wherein the Nth recognition model is configured to recognize a plurality of target expression types, and the second recognition result is one of the plurality of target expression types.

In an exemplary embodiment of the present disclosure, in any two adjacent recognition models, the recognition accuracy of the former recognition model is greater than the recognition accuracy of the latter recognition model.

In an exemplary embodiment of the present disclosure, each of the previous N−1 recognition models is configured to recognize one target expression type.

In an exemplary embodiment of the present disclosure, the image recognition processor realizes the expression recognition of the face image through the Nth recognition model and outputs the second recognition result through the following steps:

processing the face image by the Nth recognition model to obtain a plurality of target expression types and a plurality of probability values corresponding thereto; and a maximum probability value being obtained by comparing the plurality of probability values, and the target expression type corresponding to the maximum probability value being used as the second recognition result.

In an exemplary embodiment of the present disclosure, each of the recognition models includes a Gabor filter.

In an exemplary embodiment of the present disclosure, each of the recognition models further includes: 16 convolutional layers, 1 global average pooling layer and 1 fully connected layer, and the convolutional layers includes 3×3 convolution kernels.

In an exemplary embodiment of the present disclosure, the facial expression recognition apparatus according to the embodiment of the present disclosure further includes:

- a data set acquisition processor, configured to acquire a facial expression training data set, wherein the facial expression training data set includes: a plurality of face images and target expression types corresponding to each of the plurality of face images;
- an order division processor, configured to determine a division order of each target expression type based on the proportion of each target expression type in the facial expression training data set; and
- a model training processor configured to sequentially generate the N recognition models by training based on the facial expression training data set and the division order.

In an exemplary embodiment of the present disclosure, the order division processor is specifically configured to sort the proportions of each target expression type in the facial expression training data set in descending order to obtain a proportion order; and

- an order of each target expression type corresponding to the proportion order is used as the division order of each target expression type.

In an exemplary embodiment of the present disclosure, the order division processor is specifically configured to: in the proportion of each target expression type in the facial expression training data set, when a maximum value is greater than a proportion threshold, arrange the target expression type corresponding to the maximum value in a first place, and randomly arrange other target expression types to obtain a plurality of division orders;

- perform binary classification division of the facial expression training data set according to each division order to obtain a plurality of subsets, and determining the impurity of the divided data set according to the plurality of subsets; and
- in the obtained impurities of the divided data set corresponding to the plurality of division orders, use the division order corresponding to the minimum value of the impurity as the division order of each target expression type.

In an exemplary embodiment of the present disclosure, the model training processor is specifically configured to: use the facial expression training data set as the current training data set;

- divide the current training data set according to jth expression type in the division order, and obtain a first subset having the expression type of the jth target expression type, and a second subset having other target expression types other than the jth target expression type; and an initial value of j being 1;
- use the first subset and the second subset as training sets to train the jth original recognition model to obtain jth recognition model, wherein the target expression type corresponding to the jth recognition model is the jth target expression type;
- add 1 to the value of j, use the second subset as the updated current training data set, and return the step of dividing the current training data set according to the j-th target expression type in the division order, until the (N−1)th recognition model being determined; and
- use the current training set updated for N−1 times to train the Nth original recognition model to obtain the Nth recognition model.

In an exemplary embodiment of the present disclosure, the facial expression recognition apparatus according to the embodiment of the present disclosure further includes:

- a target division order selection processor, configured to the impurities corresponding to each division order from small to large, and use the division orders corresponding to previous L impurities as L target division orders, wherein L is an integer greater than 1;
- a multi-model training processor, configured to, for each target division order, according to the facial expression training data set and the target division order, train and generate a plurality of target models corresponding to the target division order; and
- a recognition model selection processor, configured to test the plurality of target models corresponding to each of the L target division orders through a test set, and use the plurality of target models with the highest accuracy as the N recognition models, wherein the number of the plurality of target models with the highest accuracy rate is N.

In an exemplary embodiment of the present disclosure, N is 5, and the target expression types recognized by the previous four recognition models in the sequenced five recognition models are: happy, surprised, neutral, and sad; and the target expression types recognized by the fifth recognition model are: angry, disgusted, and fearful.

The specific details of each processor in the above apparatus have been described in detail in the corresponding method, and thus are not repeated herein.

It should be noted that each processor in the above apparatus may be a general-purpose processor, including: a central processing unit, a network processor, and the like; it may also be a digital signal processor, an application-specific integrated circuit, a field programmable gate array, or other programmable logic devices, a discrete gate or transistor logic device, a discrete hardware component. Various processors in the above apparatus may be independent processors, or may be integrated together.

It should be noted that although several processors of the apparatus for action performance are mentioned in the above detailed description, this division is not mandatory. Indeed, in accordance with embodiments of the present disclosure, the features, and functions of two or more processors described above may be embodied in one processor. Conversely, the features and functions of one processor described above may be further divided into embodiments embodied by multiple processors.

In an exemplary embodiment of the present disclosure, an electronic device is further provided, and the electronic device includes: a processor; and a memory configured to store executable instructions for the processor; wherein the processor is configured to perform all or part of the steps of the expression recognition method according to the exemplary embodiments.

Figure 14:
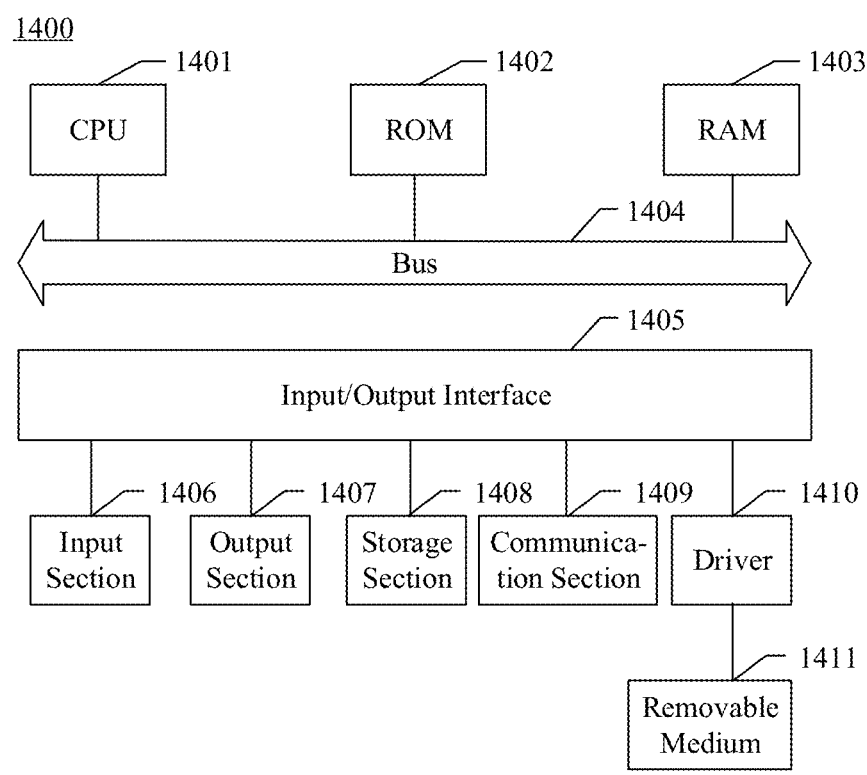
FIG. 14 shows a schematic structural diagram of a computer system suitable for implementing an electronic device according to an embodiment of the present disclosure.

FIG. 14 shows a schematic structural diagram of a computer system suitable for implementing an electronic device according to an embodiment of the present disclosure. It should be noted that a computer system 1400 of the electronic device shown in FIG. 14 is only an example, and should not impose any limitations on the functions and scope of use of the embodiments of the present disclosure.

As shown in FIG. 14, the computer system 1400 includes a central processing unit 1401 that may perform various appropriate actions and processes according to a program stored in a read-only memory 1402 or a program loaded into a random access memory 1403 from a storage section 1408. In the random access memory 1403, various programs and data necessary for system operation are also stored. The central processing unit 1401, the read-only memory 1402, and the random access memory 1403 are connected to each other through a bus 1404. An input/output interface 1405 is also connected to the bus 1404.

The following components are connected to the input/output interface 1405: an input section 1406 including a keyboard, a mouse, etc.; an output section 1407 including a cathode ray tube (CRT), a liquid crystal display (LCD), etc., and a speaker, etc.; a storage section 1408 including a hard disk, etc.; and a communication section 1409 that includes a network interface card such as a local area network (LAN) card, a modem, etc. The communication section 1409 performs communication processing via a network such as the Internet. A driver 1410 is also connected to the input/output interface 1405 as needed. A removable medium 1411, such as a magnetic disk, an optical disk, a magneto-optical disk, a semiconductor memory, etc., is mounted on the driver 1410 as needed, such that a computer program read therefrom is installed into the storage section 1408 as needed.

In particular, according to an embodiment of the present disclosure, the processes described above with reference to the flowcharts may be implemented as computer software programs. For example, an embodiment of the present disclosure includes a computer program product including a computer program carried on a computer-readable medium, the computer program containing program code for performing the method illustrated in the flowchart. In such an embodiment, the computer program may be downloaded and installed from the network via the communication section 1409, and/or installed from the removable medium 1411. When the computer program is executed by the central processing unit 1401, various functions defined in the apparatus of the present application are performed.

In an exemplary embodiment of the present disclosure, there is also provided a non-volatile computer-readable storage medium on which a computer program is stored, wherein the method according to any one of the methods described above is implemented when the computer program is executed by a processor.

It should be noted that the non-volatile computer-readable storage medium shown in the present disclosure may be, for example, but not limited to, an electrical, magnetic, optical, electromagnetic, infrared, or semiconductor system, apparatus or device, or any combination thereof. More specific examples of non-volatile computer-readable storage media may include, but are not limited to, an electrical connection having one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any combination thereof. In the present disclosure, a non-volatile computer-readable storage medium may be any tangible medium that contains or stores a program that can be used by or in conjunction with an instruction execution system, apparatus, or device. In the present disclosure, a computer-readable signal medium may include data signals propagated in baseband or as part of a carrier wave, carrying computer-readable program code therein. Such propagated data signals may take a variety of forms including, but not limited to, electromagnetic signals, optical signals, or any combination thereof. The computer-readable signal medium may also be any computer-readable medium other than the non-volatile computer-readable storage medium, and the computer-readable medium may transmit, propagate, or transport the program for use by or in connection with the instruction execution system, apparatus, or device. The program code embodied on the computer readable medium may be transmitted using any suitable medium including, but not limited to, wireless, lines, optical fiber cable, radio frequency, etc., or any combination thereof.

Other embodiments of the present disclosure will readily occur to those skilled in the art upon consideration of the specification and practice of the invention disclosed herein. The present application is intended to cover any variations, uses, or adaptations of the present disclosure that follow the general principles of the present disclosure and include the common knowledge or the conventional technical solutions in the technical field not disclosed by the present disclosure. The specification and embodiments are to be regarded as exemplary only, with the true scope and spirit of the disclosure being indicated by the following claims.

It should be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. An expression recognition method, comprising:
acquiring a face image to be recognized; and
inputting the face image into N different recognition models arranged in sequence for expression recognition and outputting an actual expression recognition result, the N different recognition models being configured to recognize different target expression types, wherein N is an integer greater than 1;
wherein the inputting the face image into the N different recognition models arranged in sequence for expression recognition and outputting the actual expression recognition result comprises: inputting the face image into ith recognition model for expression recognition and outputting a first recognition result, wherein i is an integer ranging from 1 to N−1, and an initial value of i is 1;
determining whether the first recognition result and the target expression type corresponding to the ith recognition model are same, outputting the first recognition result as the actual expression recognition result when the first recognition result is same as the target expression type corresponding to the ith recognition model, and inputting the face image into (i+1)th recognition model for expression recognition when the first recognition result is different from the target expression type corresponding to the ith recognition model; and
in response to inputting the face image into Nth recognition model, outputting a second recognition result as the actual expression recognition result by performing expression recognition on the face image through the Nth recognition model, wherein the Nth recognition model is configured to recognize a plurality of target expression types, and the second recognition result is one of the plurality of target expression types.

2. The method according to claim 1, wherein, in any two adjacent recognition models, a recognition accuracy of a former recognition model is greater than a recognition accuracy of a latter recognition model.

3. The method according to claim 1, wherein each of previous N−1 recognition models is configured to recognize one target expression type.

4. The method according to claim 1, wherein outputting the second recognition result by performing the expression recognition on the face image through the Nth recognition model comprises:
  processing the face image through the Nth recognition model to obtain a plurality of target expression types and a plurality of probability values corresponding thereto; and
  obtaining a maximum probability value by comparing the plurality of probability values, and outputting a target expression type corresponding to the maximum probability value as the second recognition result.

5. The method according to claim 1, wherein each of the recognition models comprises a Gabor filter.

6. The method according to claim 1, wherein each of the recognition models comprises: 16 convolutional layers, 1 global average pooling layer and 1 fully connected layer, and the convolutional layer comprises 3×3 convolution kernels.

7. The method according to claim 1, wherein, before inputting the face image into N different recognition models arranged in sequence for expression recognition, the method further comprises:
  acquiring a facial expression training data set, wherein the facial expression training data set comprises: a plurality of face images and target expression types corresponding to each of the plurality of face images;
  determining a division order of each target expression type based on a proportion of the each target expression type in the facial expression training data set; and
  sequentially generating the N recognition models by performing training based on the facial expression training data set and the division order.

8. The method according to claim 7, wherein determining the division order of the each target expression type based on the proportion of the each target expression type in the facial expression training data set comprises:
  obtaining a proportion order by sorting the proportions of the each target expression type in the facial expression training data set in descending order; and
  determining an order of the each target expression type corresponding to the proportion order as the division order of the each target expression type.

9. The method according to claim 7, wherein the sequentially generating the N recognition models by performing training based on the facial expression training data set and the division order comprises:
  using the facial expression training data set as a current training data set;
  dividing the current training data set according to jth expression type in the division order, and obtaining a first subset of expression type corresponding to the jth target expression type, and a second subset corresponding to other target expression types other than the jth target expression type, wherein an initial value of j is 1;
  training a jth original recognition model by using the first subset and the second subset as training sets to obtain jth recognition model, wherein a target expression type corresponding to the jth recognition model is the jth target expression type;
  adding 1 to a value of j, using the second subset as the current training data set as updated, and returning the step of dividing the current training data set according to the j-th target expression type in the division order, until the (N−1)th recognition model being determined; and
  train an Nth original recognition model by using the current training set updated for N−1 times to obtain the Nth recognition model.

10. The method according to claim 7, wherein the determining the division order of the each target expression type based on the proportion of each target expression type in the facial expression training data set comprises:
  in the proportion of the each target expression type in the facial expression training data set, when a maximum value is greater than a proportion threshold, arranging a target expression type corresponding to the maximum value in a first place, and randomly arranging other target expression types to obtain a plurality of division orders;
  performing binary classification division of the facial expression training data set according to each of the plurality of division orders to obtain a plurality of subsets, and determining impurity of divided data set according to the plurality of subsets; and
  in the obtained impurities of the divided data set corresponding to the plurality of division orders, determining a division order corresponding to a minimum value of the obtained impurities as the division order of the each target expression type.

11. The method according to claim 10, wherein after the determining the impurity of the divided data set, the method further comprises:
  sorting the impurities corresponding to the plurality of division orders in ascending order, and determining division orders corresponding to previous L impurities as L target division orders, wherein L is an integer greater than 1;
  performing training, according to the facial expression training data set and each of the L target division orders, to generate a plurality of target models corresponding to the each of the L target division orders; and
  testing the plurality of target models corresponding to the each of the L target division orders through a test set, and determining the plurality of target models with a highest accuracy as the N recognition models, wherein a number of the plurality of target models with the highest accuracy rate is N.

12. The method according to claim 1, wherein N is 5, and the target expression types to be recognized by previous four recognition models in 5 recognition models as sequentially arranged are: happy, surprised, neutral, and sad; and the target expression types to be recognized by a fifth recognition model are: angry, disgusted, and fearful.

13. An electronic device comprising:
  at least one hardware processor; and
  a memory configured to store executable instructions for the at least one hardware processor that, when executed, directs the at least one hardware processor to:
    acquire a face image to be recognized; and
    input the face image into N different recognition models arranged in sequence for expression recognition and outputting an actual expression recognition result, the N different recognition models being configured to recognize different target expression types, wherein N is an integer greater than 1;
    input the face image into ith recognition model for expression recognition and outputting a first recognition result, wherein i is an integer ranging from 1 to N−1, and an initial value of i is 1;
    determine whether the first recognition result and the target expression type corresponding to the ith recognition model are same, output the first recognition result as the actual expression recognition result when the first recognition result is same as the target expression type corresponding to the ith recognition model, and input the face image into (i+1)th recognition model for expression recognition when the first recognition result is different from the target expression type corresponding to the ith recognition model; and in response to the face image into Nth recognition model being inputted, output a second recognition result as the actual expression recognition result by performing expression recognition on the face image through the Nth recognition model, wherein the Nth recognition model is configured to recognize a plurality of target expression types, and the second recognition result is one of the plurality of target expression types.

14. The device according to claim 13, wherein, in any two adjacent recognition models, a recognition accuracy of a former recognition model is greater than a recognition accuracy of a latter recognition model.

15. The device according to claim 13, wherein each of previous N−1 recognition models is configured to recognize one target expression type.

16. The device according to claim 13, wherein the at least one hardware processor is further directed to:

process the face image through the Nth recognition model to obtain a plurality of target expression types and a plurality of probability values corresponding thereto; and obtain a maximum probability value by comparing the plurality of probability values, and output a target expression type corresponding to the maximum probability value as the second recognition result.

17. The device according to claim 13, wherein each of the recognition models comprises a Gabor filter.

18. The device according to claim 13, wherein each of the recognition models comprises: 16 convolutional layers, 1 global average pooling layer and 1 fully connected layer, and the convolutional layer comprises 3×3 convolution kernels.

19. The device according to claim 13, wherein the at least one hardware processor is further directed to:

acquire a facial expression training data set, wherein the facial expression training data set comprises: a plurality of face images and target expression types corresponding to each of the plurality of face images;

determine a division order of each target expression type based on a proportion of the each target expression type in the facial expression training data set; and sequentially generate the N recognition models by performing training based on the facial expression training data set and the division order.

20. A non-transitory computer-readable storage medium on which a computer program is stored, wherein the computer program, when being executed by at least one hardware processor, is used for performing an expression recognition method, comprising:

acquiring a face image to be recognized; and inputting the face image into N different recognition models arranged in sequence for expression recognition and outputting an actual expression recognition result, the N different recognition models being configured to recognize different target expression types, wherein N is an integer greater than 1;

wherein the inputting the face image into the N different recognition models arranged in sequence for expression recognition and outputting the actual expression recognition result comprises: inputting the face image into ith recognition model for expression recognition and outputting a first recognition result, wherein i is an integer ranging from 1 to N−1, and an initial value of i is 1;

determining whether the first recognition result and the target expression type corresponding to the ith recognition model are same, outputting the first recognition result as the actual expression recognition result when the first recognition result is same as the target expression type corresponding to the ith recognition model, and inputting the face image into (i+1)th recognition model for expression recognition when the first recognition result is different from the target expression type corresponding to the ith recognition model; and in response to inputting the face image into Nth recognition model, outputting a second recognition result as the actual expression recognition result by performing expression recognition on the face image through the Nth recognition model, wherein the Nth recognition model is configured to recognize a plurality of target expression types, and the second recognition result is one of the plurality of target expression types.

* * * * *

UNITED STATES PATENT AND TRADEMARK OFFICE
CERTIFICATE OF CORRECTION

| | |
|---|---|
| PATENT NO. | : 12,131,584 B2 |
| APPLICATION NO. | : 17/642781 |
| DATED | : October 29, 2024 |
| INVENTOR(S) | : Yanhong Wu |

It is certified that error appears in the above-identified patent and that said Letters Patent is hereby corrected as shown below:

On the Title Page

Item (73) Assignee should be changed from "BOE TECHNOLOGY GROUP CO., LTD" to
-- BOE TECHNOLOGY GROUP CO., LTD. --.

Signed and Sealed this
Eighteenth Day of February, 2025

Coke Morgan Stewart
*Acting Director of the United States Patent and Trademark Office*